United States Patent [19]
Jang

[11] Patent Number: 5,604,760
[45] Date of Patent: Feb. 18, 1997

[54] CIRCUIT FOR DRIVING SECOND HARMONIC GENERATOR

[76] Inventor: Hyeon-yong Jang, Na-202, 284-12, Seokchon-dong, Songpa-gu, Seoul, Rep. of Korea

[21] Appl. No.: 516,542

[22] Filed: Aug. 18, 1995

[30]     Foreign Application Priority Data

Aug. 31, 1994 [KR] Rep. of Korea ............... 94-21898

[51] Int. Cl.⁶ ........................................ H01S 3/00
[52] U.S. Cl. ........................ 372/38; 372/29; 372/34
[58] Field of Search ..................... 372/22, 29, 31, 372/32, 34, 38

[56]           References Cited

U.S. PATENT DOCUMENTS 4,577,320  3/1986  Yoshikawa et al. ............... 372/29

*Primary Examiner*—Brian Healy
*Assistant Examiner*—Robert E. Wise
*Attorney, Agent, or Firm*—Cushman Darby & Cushman IP Group of Pillsbury Madison & Sutro LLP

[57]           ABSTRACT

A circuit is provided for driving a second harmonic generator, wherein an unstable optical output caused by a non-linear optical element is stabilized. The optical output value produced by the second harmonic generator is integrated using an integration coefficient selected using a switch according to the level of the optical output value. The integration coefficient may be defined using a first integration coefficient setting resistor connected in parallel with a series connection including a second integration coefficient setting resistor and a negative-polarity-controlled switch.

11 Claims, 3 Drawing Sheets

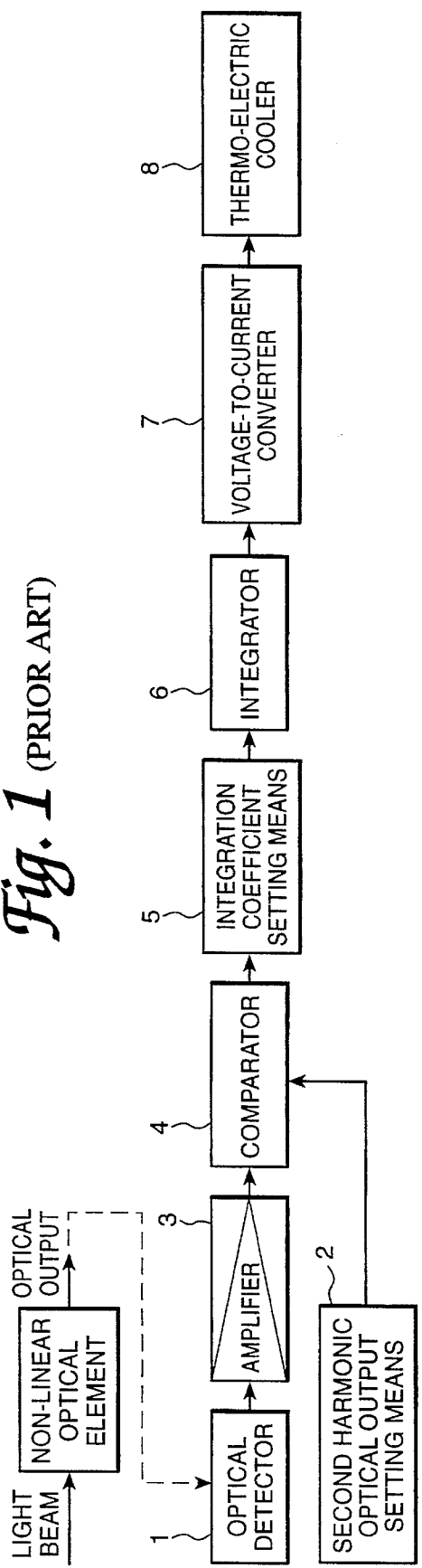
Fig. 1 (PRIOR ART)
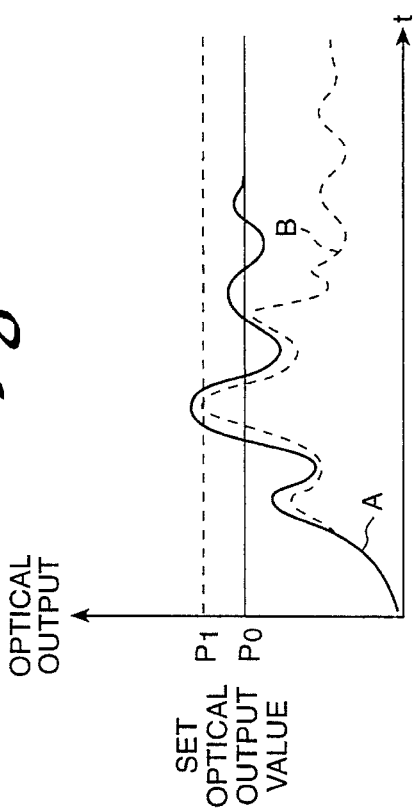
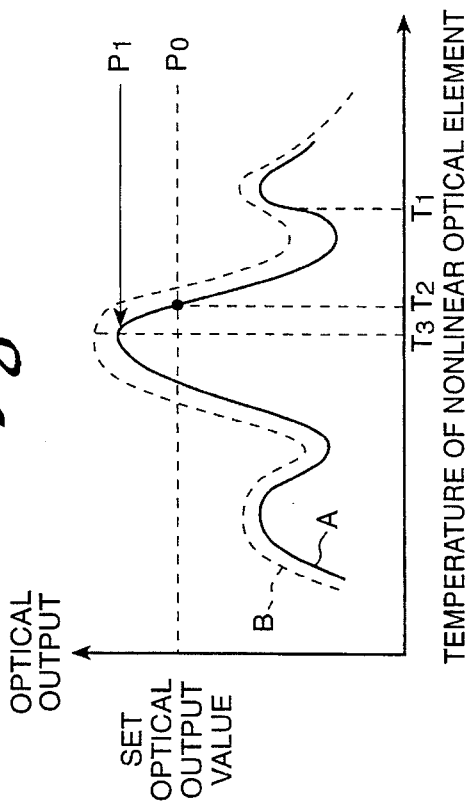

CIRCUIT FOR DRIVING SECOND HARMONIC GENERATOR

BACKGROUND OF THE INVENTION

The present invention relates to a circuit for driving a second order harmonic generator to improve a phenomenon of unstable optical output caused by a nonlinear optical element.

In an optical recording method in which data is recorded and/or reproduced using a laser beam, an infrared (e.g., 830 nm) semiconductor laser diode is used to generate a beam to perform recording and reproduction operations. High density recording/reproducing, however, requires a laser diode, because a focused 830 nm laser beam spot has a focal diameter greater than 830 nm. A, laser optical source having a wavelength shorter than 830 nm can reduce the focal diameter and thus increase recording density.

Examples of a short-wavelength laser optical sources include a helium-neon laser and an argon laser. These types of lasers, however, are not suitable for consumer purposes due to their bulkiness, high power consumption, and difficulty in handling.

A second harmonic generator generates a 1064 nm laser optical source, by pumping a Nd:YAG using a relatively small 809 nm semiconductor laser which can be easily handled, and provides a second harmonic (a 532 nm laser beam which corresponds to half the wavelength of the 1064 nm laser beam) using a nonlinear element such as $KNbO_3$ or potassium titanyl phosphate ($KTiOPO_4$: KTP).

Since a second harmonic generator adopts the nonlinear optical element, which is very sensitive to temperature, the optical output maybe unstable. Thus, the temperature of the nonlinear its optical element should be precisely controlled for a constant lasers output.

The structure of a conventional second harmonic generator will first be described below.

An 809 nm laser beam output from the laser diode of a second harmonic generator passes through a first mirror and excites a Nd:YAG located in a resonator, to generate a lased 1064 nm fundamental wave. Here, a Brewster plate and a nonlinear optical element are situated between the Nd:YAG and a second mirror, and the second harmonic wave (532 nm) is generated from the nonlinear optical element.

The beam proceeding toward the second mirror includes both beam components of 1064 nm and 532 nm wavelengths. Since the second mirror has a high reflection ratio with respect to the fundamental wave, the 1064 nm beam is reflected toward the first mirror and only the 532 nm beam is output. Here, a plate whose transmission-to-reflection ratio is 97:3 is used for inputting a portion of the output harmonic beam to an optical detector via a beam splitter. The optical element is used to output a stable second harmonic wave.

When the 532 nm laser beam (second harmonic) reaches the optical detector, a photo-electric conversion occurs, to thereby convert the received beam into a current signal in proportion to the input beam intensity. The current signal is input to a driving circuit for a second harmonic generator. A control signal output from the second harmonic generator is input to a thermo-electric cooler, to thereby control the temperature of the nonlinear optical element.

FIG. 1 is a block diagram of a circuit for driving a conventional second harmonic generator. The structure and operation of that circuit will now be described.

The illustrated circuit for driving a second harmonic generator is composed of an optical detector 1, an amplifier 3, second harmonic optical output setting means 2, a comparator 4, an integration coefficient setting means 5, an integrator 6, a voltage-to-current converter 7 functioning as a driver, and a thermoelectric cooler 8.

The current generated from optical detector 1, corresponding to an optical output from a nonlinear optical element, of a second harmonic generator is input to amplifier 3 to stabilize the optical output. The current signal is converted into a voltage signal by amplifier 3 and input, which comparator 4 to compares the resulting with a set voltage from second harmonic optical output setting means 2. The output from comparator 4 becomes an optical output error signal, the value of which is integrated in integrator 6. The integrated voltage is used to control voltage-to-current converter 7 and drive thermo electric cooler 8, to thereby control the second harmonic generator's temperature of the nonlinear optical element.

FIG. 2 shows the optical output characteristics of a second harmonic generator according to its temperature of the nonlinear optical element at an initial operation state (A) of the second harmonic generator and at a stable state (B) which may be reached, after several minutes. As shown in FIG. 2, the output is higher after stabilization.

Here, as shown in FIG. 2, the nonlinear optical element has a plurality of optical output peaks, according to temperature. An optical output error signal is used to perform negative feedback until the actual optical output value is equal to the desired (set) optical output value. The optical output error signal is applied to thermo-electric cooler 8, to lower the temperature of the nonlinear optical element.

In FIG. 3, the temperature of a nonlinear optical element is cooled from an initial temperature $T_1$ to a lower temperature $T_2$ which causes the second harmonic optical output value to reach a set range of optical output values, i.e., to become stabilized. This is done by performing negative feedback. After cooling the nonlinear optical element to the lower temperature $T_2$, the optical output increases beyond the set range of optical output values between $P_0$ to $P_1$, at which point it is decreased. Once the temperature converges set range of output a values, the temperature is held steady. When the optical output varies, the temperature of the nonlinear optical element is adjusted to generate an optical output within the set range.

The second harmonic output characteristics vary according to the temperature of the second harmonic generator, with respect the input optical amount, and across the spectrum.

When the temperature of nonlinear optical element is slowly adjusted from $T_1$ to $T_2$ before the second harmonic generator is stabilized, so as to generate an actual optical output within the set range of optical outputs, the actual temperature $T_2$ of the nonlinear optical element does not exactly reach $T_2$ and generally overshoots $T_2$ a peak temperature $T_3$. When the overshoot optical output value is below $P_1$ which represents the output characteristic of the nonlinear optical element upon initial operation, the optical output value is stabilized at the set optical output value, to thereby obtain the optical output characteristic curve A shown in FIG. 3.

However, when the overshoot optical output value is over peak $P_1$, the optical output value is unstable and an intended optical output value cannot be obtained.

SUMMARY OF THE INVENTION

To solve the above problems, it is an object of the present invention to provide a circuit for driving a second harmonic generator in which a stable optical output can be obtained even when the overshoot optical output value is greater than the initial peak optical output value ($P_1$), by controlling the temperature of a nonlinear optical element before stabilization of the second harmonic generator.

To achieve the above object, a circuit is provided for driving a second harmonic generator. The circuit comprises an optical detector for detecting the optical output value of a nonlinear optical element generating a current signal proportional to the optical output value; an amplifier for converting the current signal output from the optical detector into a voltage signal and amplifying the result; second harmonic optical output setting means for setting the optical output level of the nonlinear optical element to a desired level; a first comparator for comparing the detected optical output value input from the amplifier with a set optical output value applied from the optical output setting means, to produce an error signal; an integrator for integrating the error signal from the first comparator to equalize the second harmonic optical output value with the set optical output value of the second harmonic optical output setting means; first integration coefficient setting means for setting a first integration coefficient applied to the integrator when the output value of the first comparator represents a normal control operation; a second comparator for generating a logic signal indicating the amplitude relationship between the output value of the first comparator and any overshoot limitation value, and then for deciding a control operation; second integration coefficient setting means for setting a second integration Coefficient of the integrator, according to the output value of the second comparator; switching means for connecting the second integration coefficient setting means to the integrator, according to the output value of the second comparator; a voltage-to-current converter for converting the output voltage of the integrator into a current signal; and a thermo-electric cooler for controlling the temperature of the nonlinear optical element, according to the current output from the voltage-to-current converter.

BRIEF DESCRIPTION OF THE DRAWINGS

The above objects and advantages of the present invention will become more apparent by describing in detail a preferred embodiment thereof with reference to the attached drawings in which:

FIG. 1 is a block diagram of a conventional circuit for driving a second harmonic generator;

FIG. 2 is a graph showing an optical output characteristic of a second harmonic generator according to the temperature of the nonlinear optical element;

FIG. 3 is a graph showing optical output stability of the second harmonic generator over time;

DETAILED DESCRIPTION OF THE INVENTION

Figure 4:
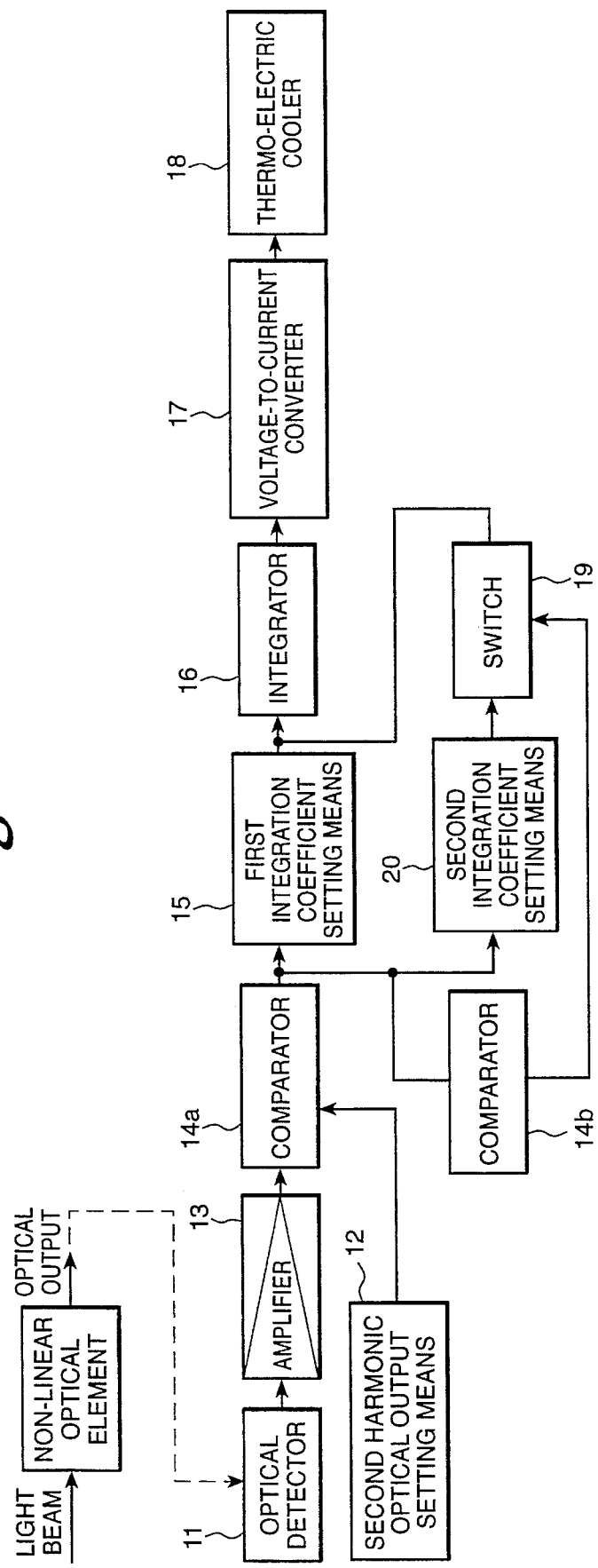
FIG. 4 is a block diagram of a circuit for driving a second harmonic generator according to the present invention.
Figure 5:
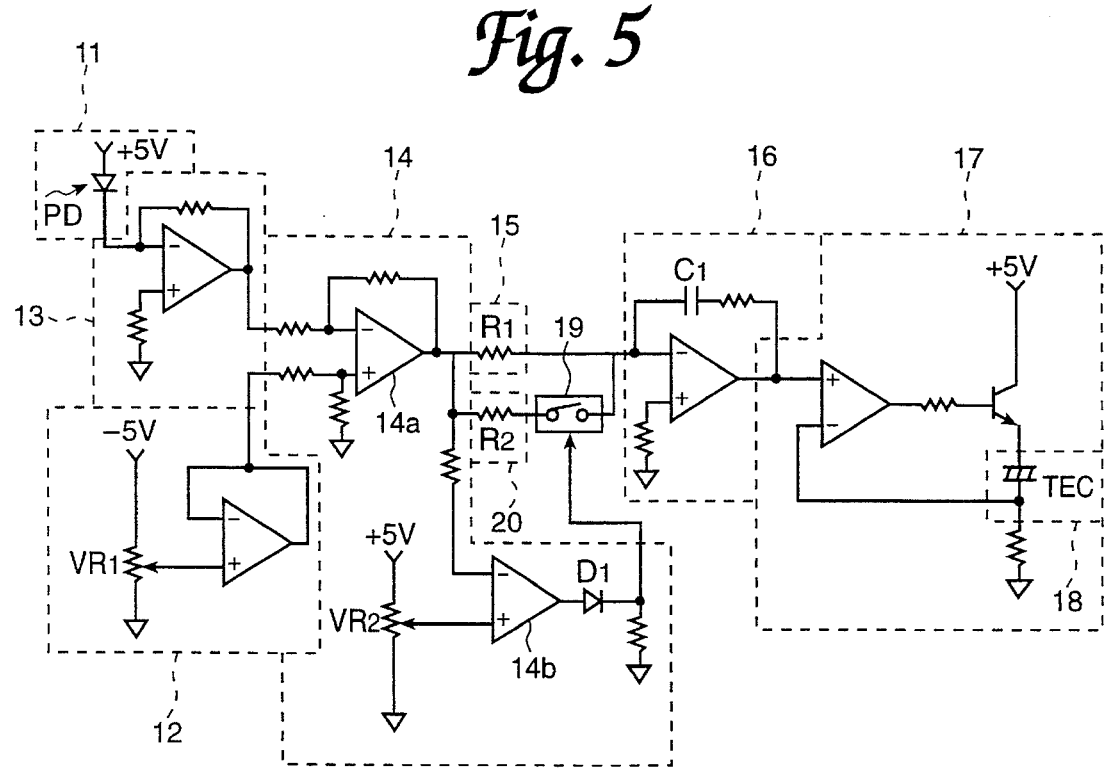
FIG. 5 is a circuit diagram of the second harmonic generator according to the present invention.

Referring to FIGS. 4 and 5, a circuit will be for driving a second harmonic generator.

The illustrated circuit for driving a second harmonic generator comprises an optical detector 11, second harmonic optical output setting means 12, an amplifier 13, a comparator 14, a first integration coefficient setting means 15, an integrator 16, a voltage-to-current converter 17 which serves as a driver, and a thermo-electric cooler 18.

Current generated from optical detector 11, which corresponds to the optical output from a nonlinear optical element, is input to amplifier 13 to stabilize the optical output. The current signal is converted into a voltage signal by amplifier 13 and input to comparator 14 where it is compared with a set voltage of second harmonic optical output setting means 12. The output from comparator 14 becomes an optical output error signal, the value of which is integrated in integrator 16. The integrated voltage is used to control voltage-to-current converter 17 and drive thermo-electric cooler 18, to thereby control the temperature of the nonlinear optical element.

In order to stabilize the optical output value the circuit for driving the second harmonic generator further comprises a switch 19 and a second integration coefficient setting means 20. Therefore, even when the overshoot optical output value is over $P_1$ (representing the output characteristic of the nonlinear optical element upon initial operation), a stable output (b) can be obtained as shown FIG. 6.

An embodiment of a circuit for driving the second harmonic generator according to the present invention will be described in further detail with reference to FIG. 5.

When the second harmonic optical output is detected by an optical detector (PD), a current signal proportional to optical intensity is generated. Amplifier 13 converts this current into an amplified voltage signal. The negative voltage set by variable resistance $VR_1$ of second harmonic optical output setting means 12 is voltage-divided and input to the non-inverting input of a first operational amplifier 14a of comparator 14. Amplifier 13 performs a buffering function acting as a voltage follower.

First operational amplifier 14a outputs the difference between the outputs of amplifier 13 and second harmonic optical output setting means 12 as an error signal. This error signal is connected to the inverting input of a second operational amplifier 14b and to integrator 16 via first and second integration coefficient setting means 15 and 20 constituted by resistors $R_1$ and $R_2$, respectively. The integrated voltage of integrator 16 provides current for thermoelectric cooler (TEC) 18 via voltage-to-current converter 17, to thereby cool the nonlinear optical element and output a stable second harmonic.

Figure 6:
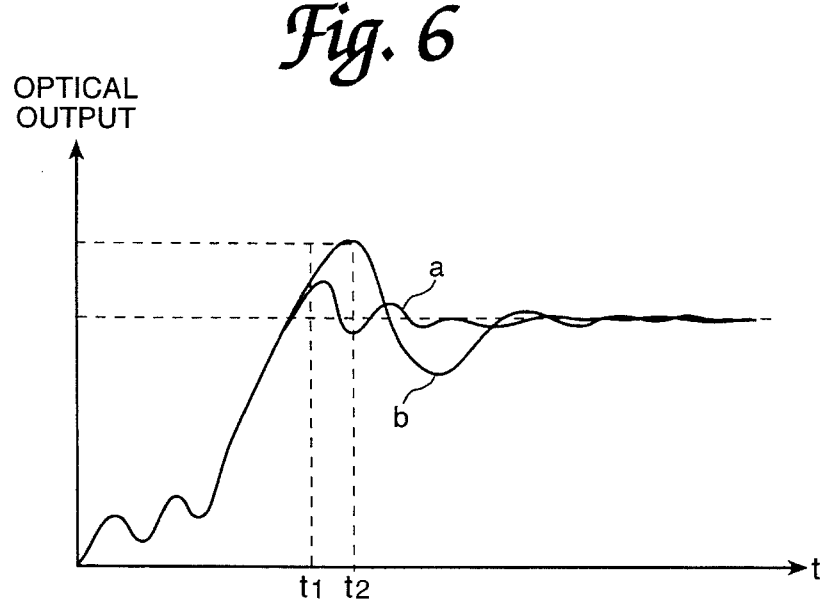
FIG. 6 is a graph showing optical output stability of a conventional second harmonic generator compared to that of an embodiment of the present invention.

FIG. 6 shows initial operation characteristics of the optical output of a second harmonic generator. Here, dashed line "b" is a response characteristic curve of the conventional second harmonic generator and the optical output value overshoots. The second harmonic optical output is stable when the maximum value of the second harmonic optical output is less than peak $P_1$ shown in FIG. 2 on the operation starting point of second harmonic generator. Thus, according to the second harmonic generator of the present invention, an overshoot limiting point is set to about 3–5% over the optical output set point, using the positive voltage set by a variable resistance $VR_2$ and input to the non-inverting input of second operational amplifier 14b.

On the other hand, when the actual optical output greatly overshoots the set optical output value after the second harmonic generator controls its actual optical output value as the set optical output value, the output of first operational amplifier 14a become a much higher positive voltage. Variable resistance $VR_2$ sets an allowable overshoot of the actual optical output.

For example, if a +0.5 V output of first comparator 14a is the allowable overshoot of the actual optical output, a +0.5 V input to the non-inverting input of second comparator 14b is set by adjusting variable resistance $VR_2$. When the input to the inverting input of second comparator 14b is more positive than the non-inverting input second comparator 14b (that is, overshoot occurs), the output of second comparator 14b is immediately inverted from positive to negative. The output of second operational amplifier 14b swings positive and negative and is rectified by diode $D_1$, so that the output becomes a logic "1" or "0." The rectified voltage is applied to the control terminal of switch 19 which is a negative polarity controlled switch, and when the control terminal voltage is low, switch 19 is closed. Accordingly, when the actual optical output value is over the allowable overshoot, a parallel resistance ($R_1$ and $R_2$) is in effect, to thus alter the integration coefficient (k) of integrator 16. Here, when the actual optical output value is over the allowable overshoot, the integration coefficient becomes $$k = \frac{1}{C_1 \left( \frac{R_1 + R_2}{R_1 R_2} \right)}$$

which sharply decreases the current provided to thermoelectric cooler 18, to thereby effectively heat the nonlinear optical element. As a result, the time required for stabilizing the optical output can be reduced due to very little overshooting, as can be seen in solid line "a" shown in FIG. 6.

Also, within the limitation of the allowable overshoot, since the voltage applied to the control terminal of switch 19 goes high, the switch is opened. As a result, resistor $R_2$ is effectively removed from the circuit, and the integration coefficient is merely $1/C_1R_1$.

As described above, there is provided an optical output stabilizing effect. That is, when the temperature of a non-linear optical element is slowly lowered (controlled) in order to stabilize the second harmonic generator output at the desired level and the actual temperature of the nonlinear optical element overshoots (goes lower than) the proper temperature for stabilization, the intended optical output value cannot be obtained. Therefore, according to the illustrated circuit for driving a second harmonic generator, a second integration coefficient setting means is connected in parallel with a first integration coefficient setting means. Then, optical output stabilization is achieved by selecting an integration coefficient according to the optical output value, using a negative-polarity-controlled switch.

What is claimed is:

1. A circuit for stabilizing a harmonic generator, said circuit comprising:

an optical signal generator for generating an optical output electrical signal in proportion to a detected optical output value output by a non-linear optical element of said harmonic generator;

a first comparator for comparing said optical output electrical signal to a setting signal received from means for setting said harmonic generator, and for producing an error signal based upon the comparison;

an integrator for integrating said error signal to produce an integral of said error signal;

integration coefficient setting means for setting an integration coefficient to be multiplied by said integral of said error signal, said integration coefficient setting means comprising means for altering said integration coefficient when said error signal is above a pre-set overshoot value; and means for controlling a temperature of said non-linear optical element of said harmonic generator in accordance with an output signal formed with said integral of said error signal multiplied by said integration coefficient.

2. The circuit according to claim 1 wherein said harmonic generator comprises a second harmonic generator.

3. The circuit according to claim 2, further comprising means for setting said second harmonic generator.

4. The circuit according to claim 2, wherein said means for setting said integration coefficient comprises an integration coefficient changing circuit and means for connecting said integration coefficient changing circuit to said integrator when said error signal is above a pre-set overshoot value.

5. The circuit according to claim 4, wherein said integration coefficient setting means comprises a first integration coefficient setting resistor connected in parallel with a series connection including a second integration coefficient setting resistor and a switch.

6. The circuit according to claim 2, wherein said integration coefficient setting means comprises another comparator for comparing said error signal output by said comparator to an overshoot value and for producing a high level logical output when said error signal output by said comparator is not above said overshoot value, and for producing a low level logical output when said error signal is above said overshoot value, said integration coefficient setting means further comprising a switch for connecting an integration coefficient changing circuit to said integrator when a low logical level is output by said another comparator.

7. The circuit according to claim 1, wherein said means for controlling a temperature of said non-linear optical element comprises means for increasing a temperature of said non-linear optical element when said error signal is above said pre-set overshoot value, and decreasing a temperature of said non-linear optical element when said error signal is not above said pre-set overshoot value.

8. The circuit according to claim 1, wherein said nonlinear optical element comprises $KNbO_3$.

9. The circuit according to claim 1, wherein said nonlinear optical element comprises potassium titanyl phosphate ($KTiOPO_4$: KTP).

10. The circuit according to claim 1, wherein said means for controlling a temperature of said non-linear optical element comprises a thermo-electric cooler.

11. A circuit for driving a second harmonic generator, said circuit comprising:

an optical detector for detecting an optical output value of a non-linear optical element, to generate a current signal proportional to the optical output value;

an amplifier for converting the current signal output from said optical detector into a voltage signal and amplifying said voltage signal;

second harmonic optical output setting means for setting an optical output level of the non-linear optical element to a desired level;

a first comparator for comparing the detected optical output value input from said amplifier with a set optical output value applied from said optical output setting means, to produce an error signal;

an integrator for integrating the error signal produced by said first comparator;

first integration coefficient setting means for apply a first integration coefficient to said integrator when the output value of said first comparator represents a normal control operation;

a second comparator for generating a logic signal based upon a relationship in amplitude between the output value of said first comparator and an overshoot limitation value;

second integration coefficient setting means for applying a second integration coefficient to said integrator, said second integration coefficient setting means comprising switching means for connecting said second integration coefficient setting means to said integrator, in accordance with said logic signal generated by said second comparator;

a voltage-to-current converter for converting an output voltage of said integrator into a current signal; and a thermo-electric cooler for controlling a temperature of said non-linear optical element, according to the current signal output from said voltage-to-current converter.

* * * * *